Aug. 30, 1966
P. J. WEAVER
3,269,413
MIXING VALVE FOR LAVATORIES
Filed Dec. 7, 1964
2 Sheets-Sheet 1
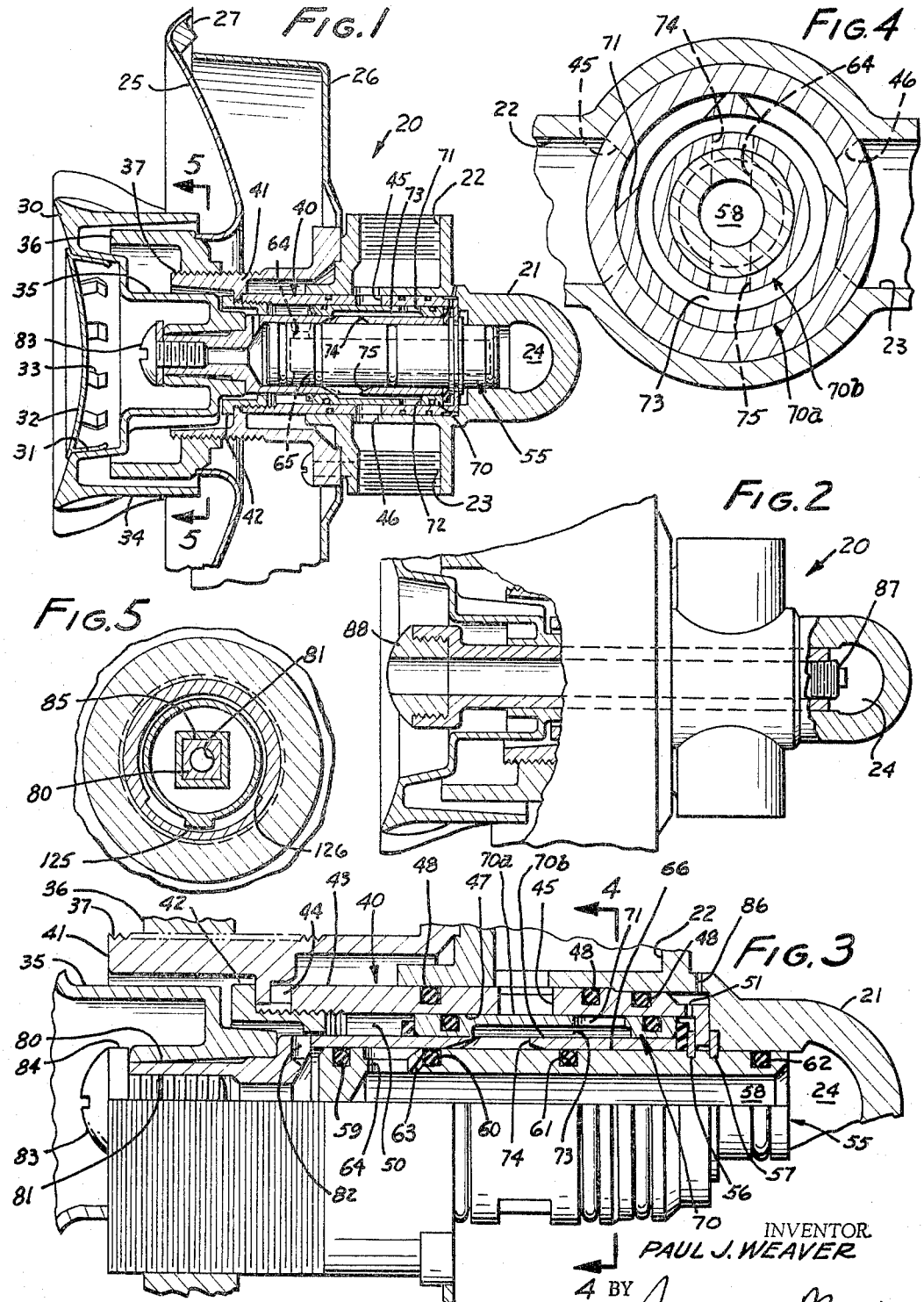
INVENTOR.
PAUL J. WEAVER
BY
Angus & Mow
ATTORNEYS.

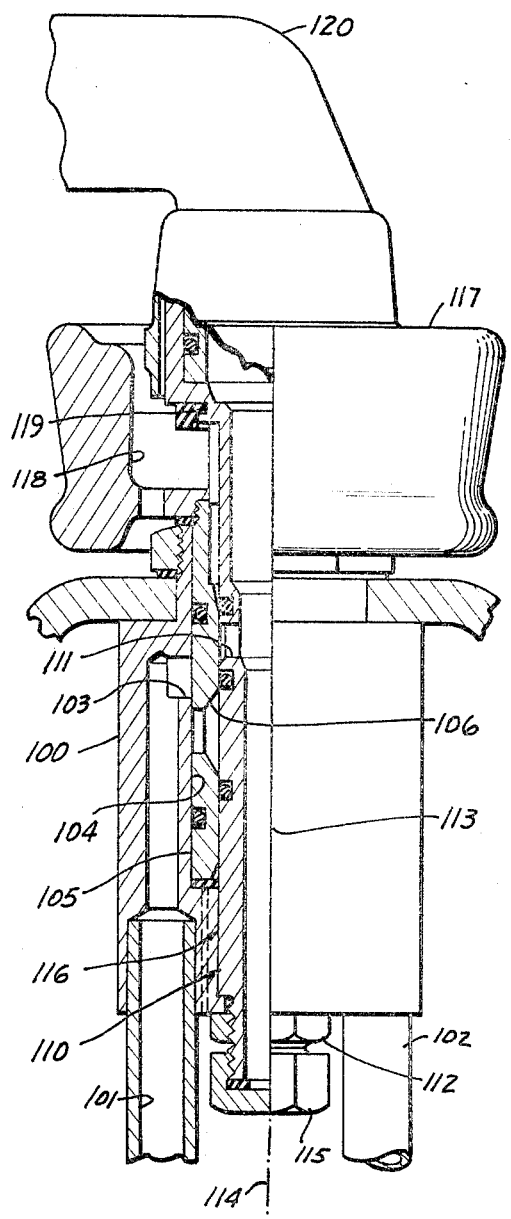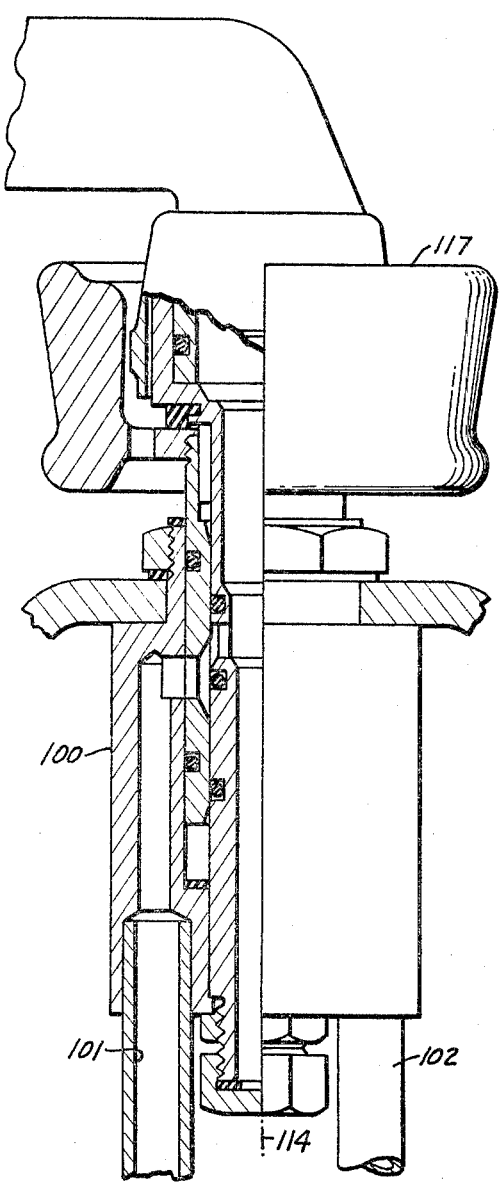

United States Patent Office 3,269,413
Patented August 30, 1966

3,269,413
MIXING VALVE FOR LAVATORIES
Paul J. Weaver, Pasadena, Calif., assignor to Graning
 Enameling Company, El Monte, Calif., a corporation
 of California
Filed Dec. 7, 1964, Ser. No. 416,570
11 Claims. (Cl. 137—625.17)

This application is a continuation-in-part of applicant's co-pending patent application, Serial No. 153,387, filed November 20, 1961, now abandoned, entitled, "Mixing Valve for Lavatories."

This invention relates to a mixing valve which is suitable for uses such as lavatories, showers and other installations in which control of mixture and flow rate by a single operator is desired.

Mixing valves which utilize a single handle or knob for the control of flow rate as well as for the mixing of hot and cold water to achieve a desired temperature are well known. Most presently known valves suffer from the defects of excessive complexity of manufacture, which increase their manufacturing and service costs, and also from a tendency to creep due to inherent pressure patterns so as to change the flow rate or the temperature setting during use which is, of course, undesirable from the standpoint of the user.

Another disadvantage of many well-known mixing valves resides in the fact that a valve which is suitable for use in a lavatory is not readily convertible for use in other installations such as for a shower valve, so that a plurality of manufactured items needs to be set up for what ought to be a more versatile valve.

It is an object of this invention to provide a mixing valve wherein a single control is useful to establish both the flow rate and the temperature of an effluent stream and which is, with few changes, adaptable for a plurality of purposes such as in lavatories, showers and the like.

This invention is accomplished by providing a body which is intended to be attached to surrounding structure. The body includes a stud (sometimes called a "tubular member") which is neither rotatably nor axially movable. Surrounding said stud, there is a sleeve assembly which is both rotatably and axially movable, which itself fits within a bore that is also fixed relative to the stud. Both the stud and the body include fixed ports, and the sleeve includes ports adapted to interconnect the same at various relative positions of the sleeve.

According to a feature of the invention, the sleeve lies between the body and the stud whereby the fluids, when flowing from the body to the stud, changes axial direction only in fixed structure, thereby overcoming any tendency of an adjustable portion of a valve to shift by virtue of the pressures applied by the fluid which is being controlled.

The above and other features of this invention, will be fully understood from the following detailed description and the accompanying drawings in which:

FIG. 1 is a cross-section of the presently preferred embodiment of the invention;

FIG. 2 is a fragmentary view of an alternate adaptation of FIG. 1;

FIG 3 is a fragmentary view, partly in cutaway cross-section of FIG. 1;

FIG. 4 is a cross-section taken at line 4—4 of FIG. 3;

FIG. 5 is a cross-section taken at line 5—5 of FIG. 1;

FIG. 6 is a side elevation, partly in cutaway cross-section, showing an alternate embodiment of the invention in one mixing position; and FIG. 7 is a view like FIG. 6 taken at another operative position of the valve.

The presently preferred embodiment of mixing valve 20 according to the invention is shown in FIG. 1. This embodiment includes a body 21 which has a pair of inlets 22, 23 for cold and hot water, respectively. This body may conveniently be attached by ears (not shown) to surrounding structure for mounting the valve. The valve shown in FIG. 1 is adapted for use in a shower valve wherein water at the flow rate and temperature established by an element yet to be described proceeds through outlet 24 to a single outlet pipe which leads to a shower, or to a faucet or some other destination. In yet another embodiment, outlet 24 will be plugged up and the outlet will be through the center of the body to the left in FIG. 1. This is the configuration used in lavatories.

Trim plates 25, 26 are shown which serve to fair the device into a hole in a surrounding mounting surface 27. A handle 30 is generally circular and has an opening 31 which is closed by a button 32 that may bear any desired indicia. The button is held in place in the opening by fingers 33 that frictionally engage the inside surface of opening 31. The handle includes a circumferential overhanging flange 34 and an internal flange 35. Between the two flanges, there projects a retainer 36 to which trim plate 25 is frictionally attached and which is threadedly attached at threads 37 to a valve insert assembly 40. In turn, this valve insert assembly includes a second retainer 41 held by a hollow screw 42. The hollow screw and the second retainer 41 may be locked together by any desired locking means such as "Loctite." The second retainer is also held by hollow screw 42 to insert body 43 and, if desired, a key 44 may be provided to hold the second retainer, the hollow screw and the insert body against relative rotation, the hollow screw thereby holding elements 41 and 43 firmly together in non-rotatable, non-axially shiftable relationship with each other. The insert body forms a structural continuation of the body and includes a pair of ports 45, 46 which are in fluid communication with inlets 22, 23, respectively, and open onto cylindrical wall 47. O-rings 48 make appropriate seals with the body.

Near the right-hand end of insert body 43 (FIG. 3), there is a vent 51 to the passage defined by wall 47. The insert body is keyed to a stud 55 (sometimes called a "tubular member") by snap rings 56, 57 disposed in appropriate grooves. The stud includes an axial passage 58 and four external O-ring grooves 59, 60, 61, 62 which carry respective O-rings. As can best be seen in FIG. 3, O-ring groove 60 is provided with a plurality of vents 63 on the left-hand side thereof for venting one side of the O-ring groove. The stud includes a pair of ports 64, 65 which are adapted selectively to be in and out of alignment with ports in a movable sleeve yet to be described, in order that water may flow into the axial passage.

The outside wall 66 of stud 55 and inner wall 47 of bore 50 through insert body 43 are spaced apart, leaving an annular opening which is occupied by a sleeve 70. The sleeve is tubular, and includes a pair of ports 71, 72 which open onto wall 47 of the insert body. These open into an annular, axially-extending passage 73, where hot and cold water mix. Another pair of ports 74, 75 interconnect passage 73 to ports 64, 65 that open onto wall 66 of the stud. The sleeve is formed in two portions, 70a, 70b, which are joined together by sliver soldering or by some adhesive such as "Loctite" so that parts 70a and 70b move as a unit in the annular space between the stud and the insert body. The tubular sleeve makes a fluid-sealing fit by means of appropriate O-rings between walls 47 and 66. It will now be seen that parts 70a and 70b which comprise sleeve 70 constitute the only movable control portion of the valve, and that this motion is derived from control exerted at a neck 80 at the left-hand end of sleeve 70.

This neck includes a threaded opening 81 which is vented at vent port 82, this vent port enabling the sleeve to move toward and away from the closed left-hand end of the stud without interference by trapped liquids. As best seen in FIGS. 1 and 5, the handle is joined to sleeve 70 by a screw 83 and washer 84 so that axial movement of the handle will cause the sleeve to move left and right in FIGS. 1 and 3. The handle is keyed to sleeve 70 by means of flats 85 as best shown in FIG. 5. Vent 86 vents the other end of the annular region to release trapped fluids. The outside of the sleeve is vented at both ends, and it is therefore freely slidable and rotatable.

It will now be seen that water may enter inlets 22, and 23, pass through respective ports 45 and 46, and then, depending on the axial and rotational setting of sleeve 70, pass through ports 71, 72, passage 73, ports 74 and 75 to the stud, and then through ports 64 and 65 in the stud, into the stud passage and out the outlet 24.

FIG. 2 shows an adaptation of essentially this same device, the only structural change being that at the right-hand end of the stud, there is placed a plug 87 which closes off flow from the right-hand end of the stud passage, and that the passage through the stud has been enlarged at the left-hand end to receive a larger hollow screw 88 through which a larger volume of fluid may be discharged to the left. This simple change adapts the general valve construction to a lavatory valve wherein the flow is entirely through the handle toward the user instead of through the back end of the valve into a pipe. Plate 32 is deleted when the water is discharged through the hollow handle.

FIG. 5 illustrates that a tongue 125 may be placed on the handle, and a circumferential recessed sector 126 may be formed in the body to limit the total rotational motion of the sleeve relative to the body so that complete rotation of the sleeve relative to the body is not possible.

In the preferred embodiment of this invention, the passages in the body insert and in the stud are placed 180° apart, while the ports in the sleeve are both placed on the same side of, and contiguous to, a diametrical line. It will be noted that this enables the central portion of the insert assembly to be removed from the insert body and turned 180°, thereby essentially reversing the orientation of the sleeve relative to the hot and cold inlets. When in the position shown in FIG. 5, the temperature is half and half, and rotation in one direction or the other will make the mixture either hotter or colder. By reversing the sleeve to create the mirror image of FIG. 5, the reversed mixture for the same rotation will be attained with only the simple rotation of the sleeve. This is a significant aid in the installation and servicing of the device.

FIGS. 6 and 7 show essentially the same construction but in connection with a situation wherein a swivel faucet is provided. In this case, a body 100 is shown which includes diametrically-opposed inlets 101, 102, which inlets discharge through identical pockets 103 and a cylindrical wall 104 toward a sleeve 105, this sleeve being provided as in the embodiment of FIGS. 1 and 2 with pair of identical, diametrically-opposed, radially-extending ports 106 that are selectively and variably, axially and rotationally alignable with respective ones of pockets 103. Within the sleeve, there is a stud 110 (sometimes called a "tubular member") which also has a pair of identical, diametrically-opposed ports 111 adapted to be aligned with ports 106. The stud is fixed to the body by nut 112, and is neither axially nor rotatably movable relative to the body. The only movable part is sleeve 105. The stud has a central axial passage 113 along axis 114, which is closed at one end by cap nut 115. The stud has an outer cylindrical wall 116, which with wall 104 forms an annular opening in which the sleeve makes a fluid-sealing fit. Appropriate O-rings are provided on opposite sides of the ports to prevent leakage to the outside.

A handle 117, with a central opening 118 therein, is mounted to sleeve 105 and locked to it either by silver soldering or by some means such as "Loctite" or other adhesive so that turning or axially shifting the sleeve varies the registration, both axially and rotatably, of the ports in the sleeve with those of the body and of the stud. The ports of the body and of the stud in all embodiments remain in fixed relationship with each other, only the sleeve being shifted for this purpose.

A swivel joint 119 is attached to the central stud at its upper end by appropriate seals and joints and provides a swingable outlet 120 to receive liquid from the passage in the stud and discharge it into a sink as desired. It will thereby the seen that the device of FIGS. 6 and 7 provides a single handle control valve in which both the volume and temperature of the mixture can be regulated by the single handle. The upper end of stud 110 could be closed, and cup nut 115 could be removed, should it be desired to have the flow extend in the opposite direction.

An examination of the figures will show that in every case herein, the fluid moves inwardly from inlets toward a passage in the stud from which the fluid is directed in one way or another to an outlet. It is a disadvantage of most common valves of this type that their flow pattern causes a pressure differential which tends to fight the control established by the handle. This is overcome in this invention by making certain that in every case wherever the water is being controlled, it is done so while it is moving radially inwardly, such as through the sleeve, where there is no axial component in either direction which would tend to shift the sleeve. On the other hand, within the stud or insert body where the water changes direction and moves one direction or the other to the outlet, the structure itself is fixed so that the resultant force is taken up by surrounding structure and there is no resultant effect on the part which accomplishes the setting. It follows also as a corollary that the force required on the handle to make this adjustment is only that which is needed to overcome the resistance of the O-rings and other seals, and is independent of water pressure.

There is therefore provided in a simple, easily-assembled, and readily-serviced device, a means for single-handle control of both rate of flow and temperature mixture of two fluid streams into one fluid stream, the forces needed for which are independent of the pressures or rates of flow.

This invention is not to be limited by the embodiments shown in the drawings and described in the description which are given by way of example and not of limitation, but only in accordance with the scope of the appended claims.

I claim:

1. A mixing valve comprising: a body provided with two flow inlets and a bore having an axis, said bore receiving the flow from said inlets; rotationally and axially movable means within said bore to move rotationally in order to proportion the flow from said inlets to said bore and provided with a mixing chamber inward of the mentioned bore, and to move axially to turn on and shut off the flow, said means having a flow opening extending laterally therethrough; a hollow handle on the axis of the bore and connected to the said means to set the latter according to the proportion of mix desired; and an axially fixed tubular member within the said means and having a longitudinal flow passage coaxial with the hollow handle and having a port to conduct flow from the mixing chamber into said passage for discharge through the hollow of the handle; the port and the tubular member being so positioned that the flow opening can stand in axial alignment therewith, and the tubular member shielding the ends of said means from unbalanced fluid forces derived from fluid which has passed through the flow opening.

2. A mixing valve according to claim 1 in which the rotational means is longitudinally slidable in said bore between valve-closing and valve-opening position under control of said handle; and the bore having pockets receptive of flow from the inlets open to the body bore and controlled by said rotational means according to the longitudinal adjustment thereof.

3. A mixing valve comprising: a body having a cylindrical bore and provided with a rear end wall closing said bore; two water inlets to said bore on opposite sides of the bore axis; a tubular stud extending axially fixedly from said end wall of the body coaxially with said body bore and in spaced relation thereto, said tubular stud having a set of ports; a mixing sleeve in said bore around said stud with a longitudinal passage open to said ports and having a flow opening in the portion thereof in longitudinal register with said water inlets, said sleeve being adapted to be turned in order to vary the angular relationship of said opening and the two inlets to vary the inlet flows through said opening to said longitudinal passage and, accordingly, to vary the proportion of mixture of said two flows reaching the ports in the stud and to be shifted axially to vary the flow rate therethrough; and means interconnecting said sleeve and the body to limit sleeve rotation to positions between an equally proportioned mix and flow only from one inlet or the other.

4. A mixing valve comprising: a body having a cylindrical bore and provided with a rear end wall closing said bore; two water inlets to said bore on opposite sides of the bore axis; a tubular stud extending axially fixedly from said end wall of the body coaxially with said body bore and in spaced relation thereto, said tubular stud having a set of ports; a mixing sleeve in said bore around said stud with a longitudinal passage open to said ports and having a flow opening in the portion thereof in longitudinal register with said water inlets, said sleeve being adapted to be turned in order to vary the angular relationship of said opening and the two inlets to vary the inlet flows through said opening to said longitudinal passage and, accordingly, to vary the proportion of mixture of said two flows reaching the ports in the stud and to be shifted axially to vary the flow rate therethrough; and means interconnecting said sleeve and the body to limit sleeve rotation.

5. A mixing valve comprising: a body having a cylindrical bore and provided with a rear end wall closing said bore; two water inlets to said bore on opposite sides of the bore axis; a tubular stud extending axially fixedly from said end wall of the body coaxially with said body bore and in spaced relation thereto, said tubular stud having a set of ports; a mixing sleeve in said bore around said stud with a longitudinal passage open to said ports and having a flow opening in the portion thereof in longitudinal register with said water inlets; said sleeve being adapted to be turned in order to vary the angular relationship of said opening and the two inlets to vary the inlet flows through said opening to said longitudinal passage and, accordingly, to vary the proportion of mixture of said two flows reaching the ports in the stud and to be shifted axially to vary the flow rate therethrough; means interconnecting said sleeve and the body to limit sleeve rotation to positions between an equally proportioned mix and flow only from one inlet or the other; and means carried by the body to limit the longitudinal movement of said sleeve.

6. A mixing valve comprising: a body having a bore with an axis, an interior cylindrical wall, and a pair of inlet ports which open through the wall and are angularly spaced apart from each other around the axis; a tubular stud rigidly and non-rotatively mounted to the body, said stud having a central passage and an outer cylindrical wall coaxial with the axis of the bore in the body, there being an annular opening between the said walls, and there being a pair of ports through the stud joining its outer cylindrical wall and its central passage, the openings in the outer cylindrical wall being angularly spaced apart from each other around the axis; a tubular sleeve slidably and rotatably fitted in said annular opening, and in fluid-sealing contact with and between the said walls, said sleeve including interconnected ports opening onto said walls so as fluidly to interconnect the ports in the body and stud when the ports in the sleeve are in registration.

7. A mixing valve according to claim 6 in which the central passage in the stud is open at only one end.

8. A mixing valve according to claim 6 in which the central passage in the stud is adapted to be opened at both ends, and in which means is provided for plugging one of said ends.

9. A mixing valve according to claim 6 in which the sleeve ports are interconnected by an axially-extending passage.

10. A mixing valve according to claim 6 in which the sleeve ports open onto the body wall exclusively on the same side of a diametral line.

11. A mixing valve according to claim 6 in which a hollow handle is attached to the sleeve for axially shifting and rotatably turning the same.

References Cited by the Examiner
UNITED STATES PATENTS

| | | | |
|---|---|---|---|
| 2,851,057 | 9/1958 | Fraser | 137—625.4 X |
| 2,870,787 | 1/1959 | Rossi | 137—636.4 X |

FOREIGN PATENTS 146,480    5/1952    Australia.

WILLIAM F. O'DEA, *Primary Examiner.*

J. O'NEILL, *Assistant Examiner.*